United States Patent
Loos et al.

[15] 3,654,791
[45] Apr. 11, 1972

[54] TOOTHED TOOL AND DEVICE FOR CHIPLESS GENERATION OF GEARS

[72] Inventors: Herbert Loos; Karl Kretzschmar, both of Munich, Germany

[73] Assignee: Carl Hurth Maschinen und Zahnradfabrik, Munich, Germany

[22] Filed: Dec. 15, 1969

[21] Appl. No.: 884,870

[30] Foreign Application Priority Data

Dec. 18, 1968 Germany ............... P 18 15 289.1

[52] U.S. Cl. .................................................. 72/88, 72/469
[51] Int. Cl. .................................................. B21h 5/02
[58] Field of Search ...................... 72/88, 90, 469, 102, 198

[56] References Cited

UNITED STATES PATENTS

| | | | |
|---|---|---|---|
| 2,165,008 | 7/1939 | Rosenberg | 72/469 |
| 2,293,930 | 8/1942 | Braendel | 72/88 X |
| 440,763 | 11/1890 | Simonds | 72/88 |
| 3,084,572 | 4/1969 | Starck | 72/88 |
| 2,930,877 | 3/1960 | Pelphrey | 72/88 X |
| 1,840,641 | 1/1932 | Short | 72/102 |
| 2,552,364 | 5/1951 | Bradbury | 72/198 X |
| 3,169,419 | 2/1965 | Clerk | 72/469 |

*Primary Examiner*—Milton S. Mehr
*Attorney*—Woodhams, Blanchard and Flynn

[57] ABSTRACT

A toothed tool for the chipless generation of gears of the type wherein the teeth have pressure concentrating serrations extending from at least near the addendum thereof to a point at least near the dedendum thereof. These serrations define ribs on the toothed flanks by which the pressure part of the tool is transmitted in a concentrated manner onto the workpiece. In the present invention, the tool is of generally elongated or rack-like shape and moves substantially rectilinearly with respect to the periphery and teeth of the workpiece. Any suitable means are provided to create the necessary pressure between the tool and the workpiece.

9 Claims, 5 Drawing Figures

PATENTED APR 11 1972　　3,654,791

Inventors
HERBERT LOOS
KARL KRETZSCHMAR
BY Woodhams, Blanchard & Flynn
ATTORNEYS

TOOTHED TOOL AND DEVICE FOR CHIPLESS GENERATION OF GEARS

The invention relates to a toothed tool and a device for the chipless generation of gears, the tooth flanks of which are provided with a number of serrations extending from the tooth addendum to the tooth dedendum and wherein the ribs forming the tooth flanks are adjacent said serrations.

It is known to utilize a gear-like tool for the chipless generation of a gear whose teeth are provided with a number of serrations. Through this the applied pressure is concentrated only on parts of the tooth flanks at which at a given applied pressure a greater contact pressure is desired; or, stated differently, a required contact pressure can be obtained with a smaller applied force.

The basic purpose of the invention is to enlarge the field of application.

To attain the basic purpose the invention provides that the tool has the shape of a rack.

The invention is directed to a wide range of specific arrangements of serrations, it is only important in this invention that at a given applied pressure the pressure is multiplied and all flank portions of the workpiece are worked.

A device according to the invention is constructed in such a manner that two racks are provided between which the workpiece is arranged for the purpose of the chipless generation of a gear. With such a device it is possible to cut gears from a solid blank and also to finish same in a final operation whereby the applied pressure can be considerably less than in the known comparable devices.

To prevent marks from appearing on the workpiece, the invention further provides that the ribs of both tools form different flank portions of the workpiece teeth.

The invention is described in connection with FIGS. 1 to 3.

Figures 1, 2:
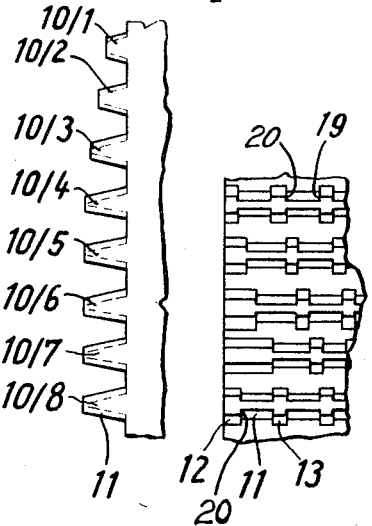
FIG. 1 is a schematic side-elevational view of a rack-like tool according to the invention.
FIG. 2 is a top view of a tool according to the invention.
Figure 5:
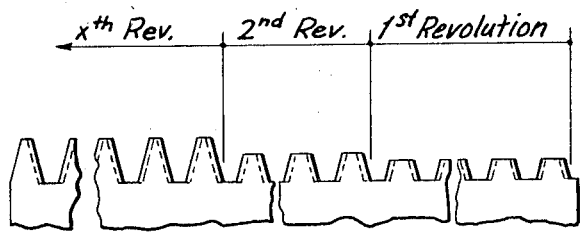
FIG. 5 shows a further example of the invention.

Figure 1 illustrates a rack-like tool, the teeth 10/1 to 10/8 of which are each provided with a number of serrations 11, also known as grooves or ineffective surface portions, extending from the addendum to the dedendum. The teeth of the rack may, if desired, all have the same height; however, in this embodiment, the teeth which start the working are of a smaller size so that the working starts with the lowest tooth 10/1. The second tooth 10/2 is slightly higher, etc., until the full tooth depth is reached, in this embodiment, at the tooth 10/4. FIG. 1 illustrates only a simplified model. The teeth for the beginning of the rolling process can also be arranged differently. For example, it is possible to work half of or the entire periphery of the workpiece first with teeth having the height 10/1. Then during the next half or full rotation the workpiece can be worked with a group of teeth which have the height 10/2, etc. until finally the final working with the teeth 10/4 to 10/8, etc. is done.

All or substantially all of these teeth are provided with the said serrations 11 which have ribs 12, 13, also known as effective surface portions, adjacent thereto. Through the provision of these effective surface portions, the applied pressure, which is required for the forming, is concentrated on special flank portions through which at a given force the pressure is increased. The ribs or effective surface portions 12 and 13 are to be arranged on the teeth which are positioned in side-by-side relationship in such a manner that all flank portions of the workpiece 14 are chiplessly worked by means of rolling. That is, the effective surface portions and the ineffective surface portions on one tooth are at least partially opposed to the respective ineffective surface portions and the effective surface portions on an adjacent tooth. In this connection, it should be emphasized that while the edges of the serrations, such as the edge 19, may in fact be relatively sharp as a result of one most convenient manner of providing same, it is not essential to the invention that they be sharp. Thus, the action is a rolling action with the flanks of the tool teeth generally parallel to the axis of the workpiece and is in no sense a cutting or shaving operation. Further, the receding surfaces 20 lie coextensively within a plane of rotation of the workpiece 14 to prevent the formation of a shaving. The receding surfaces 20 also define the sidewalls of the grooves 11.

It will be further noted by inspection of FIG. 2 of the drawing that the several serrations are offset with respect to each other in the same manner and for the same purpose as shown for the serrations in the application of Herbert Loos, Ser. No. 813,416, filed Apr. 4, 1969, now abandoned in favor of application Ser. No. 44,473, filed June 8, 1970.

Figure 4:
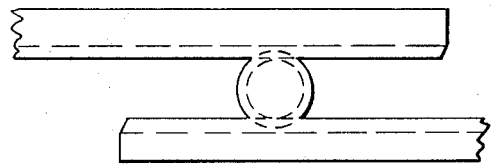
FIG. 4 shows in schematic form another example of the invention.
Figure 3:
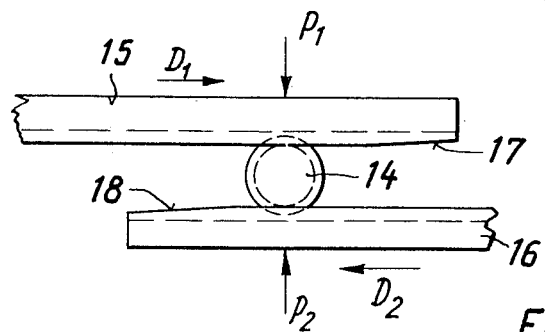
FIG. 3 illustrates a device according to the invention.

FIG. 3 illustrates an embodiment of the invention. The workpiece 14 is rolled between two racks 15, 16. The teeth of the racks are provided with serrations as have been described above. The racks have either teeth which are all of the same height, as is illustrated with 10/4 to 10/8 or a part 18 with lower teeth (for example, 10/1 to 10/3) is also provided with which the tool works itself into the full material of the workpiece.

The devices for clamping the workpiece and tool, for driving the rolling movement and for the feed into the various required directions are known and therefore not illustrated and described. Particularly by way of example, the means may be the same as those illustrated in the above mentioned application Ser. No. 44,473. Means imposing pressure against the tools 15 and 16 to urge same against the workpiece 14 may be of any conventional nature and hence are illustrated only schematically in FIG. 3 of the drawings by the arrows P1 and P2. Likewise, as in said Ser. No. 44,473, the flanks of the teeth of the tools 15 and 16 are arranged generally parallel with the rotative axis of the workpiece 14 rather than being skewed with respect thereto as in the case of gear shaving devices. The driving force for the rack-tools 15 and 16 is provided in any convenient manner and indicated generally by the arrows D1 and D2 in FIG. 3.

The invention permits the obtaining of high deformation pressures with a force which, in comparison to the known devices, is small so that the machines can herefor be lighter and less expensive than previously. Also by concentrating the applied pressure to certain flank portions of the workpiece, the quality of the workpiece is improved.

The embodiments of the invention in which an exclusive property or privilege is claimed are defined as follows:

1. A device for the chipless generation of teeth on a workpiece, comprising:
    a generally elongated toothed rack tool member arranged for substantially reciprocable motion with respect to the portion of the workpiece being worked;
    at least some of the teeth of said tool member including means defining serrations in said teeth extending from the addendum to the dedendum to thereby divide the tooth surfaces into spaced and alternate effective surface portions and ineffective surface portions, said effective and ineffective surface portions in successive teeth being laterally offset from each other and receding surfaces interconnecting said effective surface portions and said ineffective surface portions and lying coextensively within a plane of rotation of said gear blank; and
    means for urging said tool member into engagement with said portion of the workpiece for the chipless generation of the teeth thereon.

2. The device according to claim 1, including a second rack tool member similar to the above-mentioned rack tool member and arranged for engagement with said workpiece at a point substantially diametrically opposite the point of engagement of said first-mentioned rack whereby the forces urging said racks toward the workpiece will counteract each other.

3. The device according to claim 1, wherein the teeth of the rack tool member are substantially parallel to the axis of the workpiece.

4. The device according to claim 1, wherein a serrated tooth has serrations on both flanks thereof and is arranged to work opposing flanks of adjacent teeth on the workpiece.

5. A tool for use in machines for forming teeth on the peripheries of gear blanks by rolling, comprising:
   a rack having a plurality of teeth thereon;
   means defining serrations in said teeth extending from the addendum to the dedendum to thereby divide the tooth surfaces into spaced and alternate effective surface portions and ineffective surface portions, said effective and ineffective surface portions in successive teeth being laterally offset from each other and receding surfaces interconnecting said effective surface portions and said ineffective surface portions and lying coextensively within a plane of rotation of said gear blank.

6. A tool according to claim 5, wherein said effective surface portions and said ineffective surface portions on one tooth are at least partially opposed to the respective ineffective surface portions and the effective surface portions on an adjacent tooth.

7. A tool according to claim 5, wherein said plurality of teeth are all of the same height.

8. A tool according to claim 5, wherein a portion of said teeth vary in said height along the length of said rack.

9. A tool according to claim 5, wherein said serrations are grooves, the ineffective surface portions defining the bottom wall thereof and the receding surfaces defining the side walls thereof.

* * * * *